US007685257B2

(12) United States Patent
King et al.

(10) Patent No.: US 7,685,257 B2
(45) Date of Patent: Mar. 23, 2010

(54) PORTABLE THIN CLIENT FOR THE ENTERPRISE WORKSPACE

(75) Inventors: James E. King, Wokingham (GB); Karen E. Roles, Send (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1187 days.

(21) Appl. No.: 10/704,939

(22) Filed: Nov. 10, 2003

(65) Prior Publication Data

US 2005/0102377 A1 May 12, 2005

(51) Int. Cl.
*G06F 15/16* (2006.01)
(52) U.S. Cl. .................. 709/219; 709/217; 709/227; 709/228; 370/431; 455/432.1
(58) Field of Classification Search .......... 709/216, 709/218, 228, 217, 219, 227; 455/435.1, 455/432.1; 340/825.01–825.04; 370/431; 704/270.1
See application file for complete search history.

(56) References Cited

U.S. PATENT DOCUMENTS

| 6,438,577 | B1 | 8/2002 | Owens | |
|---|---|---|---|---|
| 6,512,754 | B2* | 1/2003 | Feder et al. | 370/338 |
| 6,944,826 | B2 | 9/2005 | Thornton | |
| 2002/0035699 | A1* | 3/2002 | Crosbie | 713/201 |
| 2004/0143669 | A1* | 7/2004 | Zhao et al. | 709/228 |
| 2004/0193694 | A1* | 9/2004 | Salo et al. | 709/216 |
| 2004/0203766 | A1* | 10/2004 | Jenniges et al. | 455/435.1 |
| 2004/0205158 | A1* | 10/2004 | Hsu | 709/218 |
| 2005/0003798 | A1* | 1/2005 | Jones et al. | 455/410 |
| 2007/0153794 | A1* | 7/2007 | Smith et al. | 370/390 |

OTHER PUBLICATIONS

Schmidt, et al., "The interactive performance of SLIM: a stateless, thin-client architecture," 17th ACM Symposium on Operating systems Principles (SOSP '99) Published as *Operating Systems Review*, 34(5):32-47, Dec. 1999.
"Using Smart Cards With the Sun Ray™ 1 Enterprise Appliance," Sun Microsystems, Inc. Sep. 1999, Revision 01, 19 pages.

* cited by examiner

*Primary Examiner*—Thu Ha T Nguyen
(74) *Attorney, Agent, or Firm*—Meyertons, Hood, Kivlin, Kowert & Goetzel, P.C.

(57) ABSTRACT

A system and method is provided for designing (or re-architecting) a personal digital assistant (PDA) as a portable thin client of a network. The portable thin client is a small, stateless, "plug and work" computer whose main function is to process all input and output for the user, as well as to manage communication with at least one server. All other computational tasks (or services) for the user of the PDA are performed on the server which is shared amongst a community of thin clients. As a result of re-architecting the PDA as a portable thin client, there is no need to download application(s) and operating system(s) running the application(s) to the PDA because the server—through the network—provides these services. In addition, no data is lost when a PDA is faulty or has to be changed. Moreover, in one embodiment, the portable thin client (or thin client PDA) includes smart card capabilities so that an enterprise (or business organization) can pool its PDAs with the users of the PDA on a need-to-use basis.

23 Claims, 5 Drawing Sheets

PORTABLE THIN CLIENT FOR THE ENTERPRISE WORKSPACE

BACKGROUND OF THE INVENTION

1. Field of the Invention

The present invention relates to the field of computer systems and, in particular, to portable computer systems.

2. Background

A personal digital assistant (PDA) is a small hand-held computer for storing addresses and phone numbers, taking notes, and keeping track of daily appointments. And, unlike a paper organizer, a PDA can download e-mail and play music. Though originally intended to be simple digital calendars, PDAs have evolved into machines for crunching numbers, playing games or music, and downloading information from the Internet. However, typically a PDA is intended to complement a desktop or laptop computer (PC), not replace one.

PDAs can be categorized into two major categories: hand-held computers and palm-sized computers. Compared to palm-sized computers, hand-held computers tend to be larger and heavier. They have larger liquid crystal displays (LCD) and use a miniature keyboard, usually in combination with touch-screen technology, for data entry. Palm-sized computers are smaller and lighter. They have smaller LCDs and rely on stylus/touch-screen technology and handwriting recognition programs for data entry. Regardless of the type of PDA, conventional PDAs all include microprocessors, operating systems, local memories, and input/output devices.

The microprocessor is the brain of the PDA and coordinates all of the PDA's functions according to programmed instructions. The operating system of the PDA contains the pre-programmed instructions that tell the microprocessor what to do (e.g., how to operate the applications executed by the microprocessor). The PDA stores its basic programs (address book application, calendar application, memo pad application and operating system) in a read-only memory (ROM) chip, which remains intact even when the machine shuts down. The other data and programs that are added later are stored in the PDA's random-access memory (RAM), static RAM, and/or flash memory.

Because a typical PDA is intended to work in tandem with a PC, they need to work with the same information in both places. That is, if a PDA user makes an appointment on its PC, it also needs to transfer the appointment to its PDA; if the user jots down a phone number on its PDA, it should upload the number later to its PC. So, a PDA needs to be able to communicate with a PC. The communication between PDA and PC is referred to as data synchronization or "syncing." This is typically done through a serial or USB port on the PDA. Some PDAs also offer wireless methods to transfer data to and from a PC/PC network, e.g., through a wireless e-mail/Internet service provider. In addition, some PDAs offer modem accessories to transfer files to and from a PC/PC network.

While PDAs are starting to have wireless network connectivity to facilitate data synchronization or syncing with the PC, they still rely on a locally stored operating system and applications to provide their functionalities. In this respect, the hardware resources available on the PDAs and the applications downloaded to the PDAs limit the capabilities of the conventional PDAs. Similarly, users of the PDAs have to configure the PDAs for their usage with the correct applications and parameters. In addition, if a user needs a new PDA due to a fault (or failure) of the current PDA or due to the current PDA having insufficient hardware resources, the user has to repeat the configuration process. Moreover, each PDA user needs to have its own PDA even if it only needs a PDA for a small fraction of the time. Therefore, a lot of time and cost are lost because conventional PDAs have to be periodically and individually provided, reconfigured and/or upgraded. Accordingly, there is a need to provide a PDA system and method with the advantages of a conventional PDA but avoiding the need to periodically and individually provide, reconfigure, and upgrade the PDA.

Moreover, conventional PDAs need to have sufficient memory (or storage) capacity and processing capability to execute applications locally. These requirements may conflict with the need or aim of having smaller and smaller PDAs, which may not have enough storage capacity or processing capability for storing or processing, respectively, large applications (or software programs or large parts of software programs). Accordingly, it is further desired to provide a system and method for providing a small (or thin) PDA without reducing the PDA's capabilities.

SUMMARY OF THE INVENTION

The present invention provides a thin client network architecture to a personal digital assistant (PDA). In one embodiment, the PDA of the present invention can be further described as a portable thin network client (as opposed to a thick client or a full-featured client). A portable thin client is a small, portable (e.g., wireless), stateless, "plug and work" computer whose main function is to process all input and output for the user, as well as to manage communication with at least one server. All other computational tasks (or services) for the user can then be performed on the server which is shared amongst a community of thin clients.

Because the portable thin clients of the present invention are stateless (i.e., devices that process information without any knowledge of previous/subsequent information), a user's information can be instantly sent to any thin client within the network. That is, a user can be in the middle of a user service or session (e.g., typing an e-mail message) on one portable thin client, move to another portable (or static) thin client and then resume the same user service exactly where the user left off. Similarly, if a portable thin client fails, a user can move from the failed portable thin client to another portable thin client without losing any work.

In addition, the off-loading of computational services (i.e., the traditional client processing, such as state maintenance and driver services) from the portable thin client (i.e., PDA of the present invention) to the shared servers permits simplification of the PDA because resources, such as software and hardware for performing these computational services, are not needed at the PDA. Thus, the hardware resources required for the PDA are both small and highly deterministic, as the only software and/or hardware required for any application is that needed to run the local hardware (e.g., the screen of the PDA and the input device of the PDA) and to communicate over the wireless network. More specifically, the processing/memory requirements for the PDA of the present invention can be vastly deterministic such that the entire PDA hardware may be optimized down to the input/output supported by that hardware rather than over-provisioning the hardware for future usage (because the communication bandwidth required is very deterministic).

Moreover, as a result of re-architecting the PDA as a portable thin client, there is no need to download application(s) and operating system(s) to the PDA because the server—through the network—provides these services. There is also no data loss when a PDA is faulty or has to be changed. Finally, since the present invention allows an enterprise's information technology (IT) department to make available the required applications only at the server servicing the PDAs, the network architecture of the present invention does not require a PDA upgrade if an application upgrade is required or a new application is needed.

In one embodiment, a wireless communication system for providing user sessions to wireless clients is provided by the present invention. The system includes a wireless network, a wired network, and a wireless client for providing an interface for a user to access a user session. A wireless server is coupled to the wireless client via the wireless network. Wired servers are coupled to the wireless server via the wired network. The wired servers provide the user session for the user through the wired network and maintain the user session on the wired servers. The user session includes a computational power and a state maintenance for the user.

In another embodiment, a method for using a wireless client to receive a user session is provided. The method includes inputting a user identifier (ID) into a wireless client. An Internet Protocol (IP) address is then configured for the wireless client. Once the IP address has been configured, the wireless client is connected with a server via a wireless client. The wireless client then reports its display capability and the user ID to the server. In turn, the server responds with an initial display data generated at the server for the reported user ID. The wireless client then displays this initial display data. Next, a user session for the user ID is processed at the server and displayed on the wireless client. In this embodiment, the wireless client has a capability of being shared by a plurality of different user IDs.

Moreover, the portable thin client (or thin client PDA) of the present invention may include smart card capabilities so that an enterprise (or business organization) can pool its PDAs with the users that need them. That is, a user can be provided with any thin client PDA on the enterprise's network on a need-to-use basis by inserting the user's smart card into the PDA to get the user's individual PDA configuration on that PDA. Furthermore, the concept of a shared PDA of the present invention can be expanded beyond the enterprise workplace (via a private network) to allow a user with an appropriately configured smart card to have access via the Internet to its own applications and environment by using any one of the pool of PDAs made available to the user.

A more complete understanding of the system and method for providing a portable thin client of the present invention will be afforded to those skilled in the art, as well as a realization of additional advantages and objects thereof, by a consideration of the following detailed description of the preferred embodiments. Reference will be made to the appended sheets of drawings which will first be described briefly.

BRIEF DESCRIPTION OF THE DRAWINGS

The drawings illustrate the design and utility of preferred embodiments of the invention. The components in the drawings are not necessarily to scale, emphasis instead being placed upon illustrating the principles underlying the embodiment. Moreover, in the drawings like reference numerals designate corresponding parts throughout the different views.

DETAILED DESCRIPTION

The present invention provides a thin client network architecture to a personal digital assistant (PDA). In one embodiment of the invention, the PDA is described as a portable thin client (or the PDA functions as a thin client of a network). More specifically, the present invention employs a computer network architecture in which the portable thin client (or PDA) is a small, stateless, portable (e.g., wireless), "plug and work" computer whose main function is to process all input and output for the user, as well as to manage communication with at least one server. All other computational tasks (or services) for the user are performed on the at least one server which is shared amongst a community of thin clients. In the following detailed description, like element numerals are used to describe like elements illustrated in one or more drawings.

Figure 1:
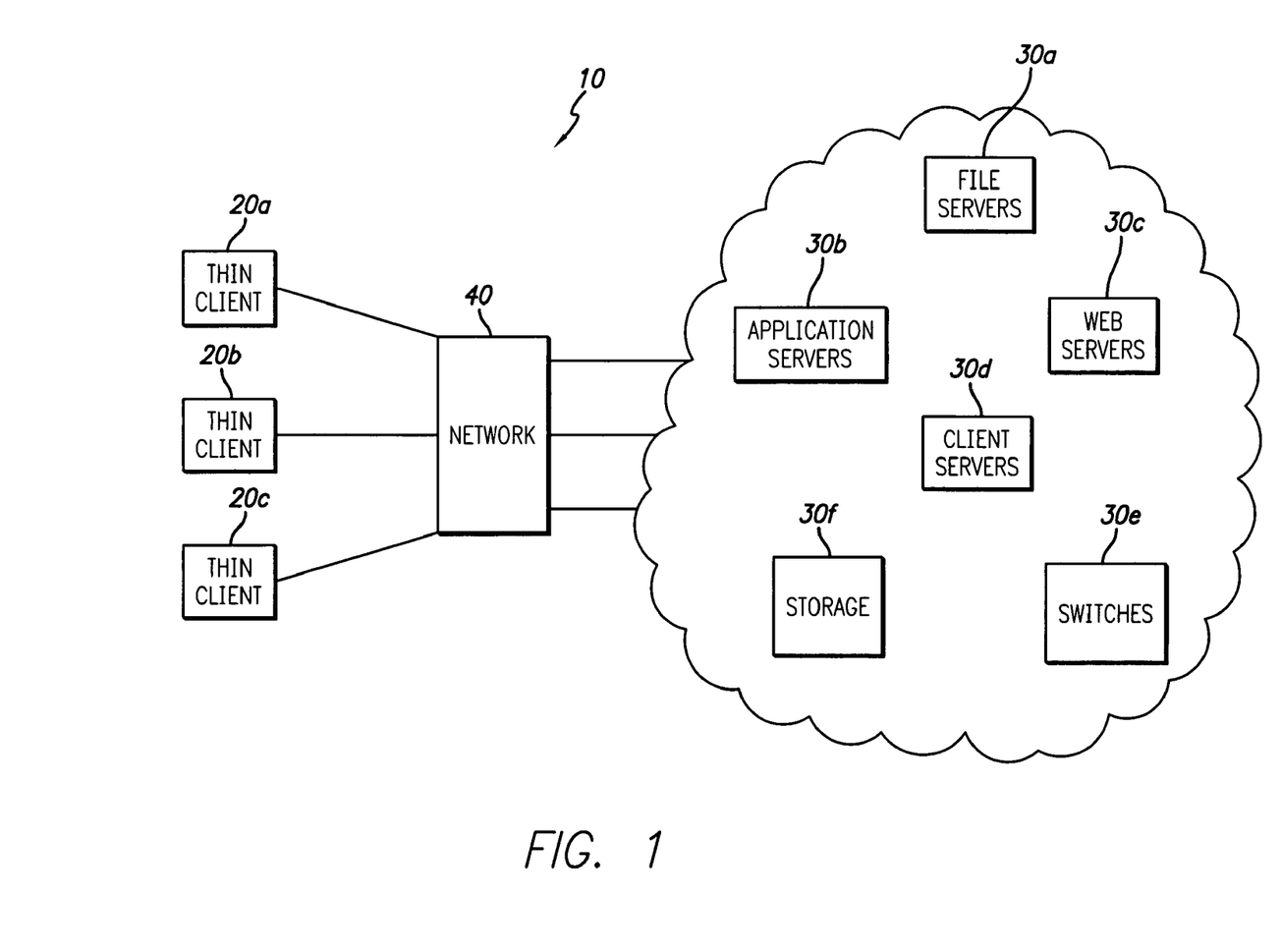
FIG. 1 illustrates a thin client computer architecture according to an exemplary embodiment.

Referring to FIG. 1, there is shown a thin client computer architecture as envisioned in an exemplary embodiment. In thin client architecture 10 of the envisioned embodiment, data and computational functionalities (e.g., PDA applications) are provided to thin clients 20 by servers 30 via network 40. At clients 20, all functionality is eliminated except that which generates output to a user (e.g. display and speakers), takes input from the user (e.g. mouse and keyboard) or other peripherals that the user may interact with (e.g., scanners, cameras, removable storage, etc.). That is, all other computational functionalities (or tasks or services) are done by servers 30 and the computation is done independently of the destination (i.e., services from servers 30 can be provided to clients 20 without the services needing to know which clients 20 the services are communicating with).

More specifically, servers 30 communicate with thin clients 20 through network 40. The computational power and state maintenance are processed and maintained at servers 30. The computational power and state maintenance (i.e., the servers) is not tied to specific computers, but may be distributed over one or more traditional computers or traditional servers. One of the servers 30 may provide one or more services, or a service may be implemented by one or more servers 30. The services provided by servers 30 can be providing computation, state (or state maintenance), and data to clients 20 and the service is under the control of a common authority or manager. In FIG. 1, the services are provided on servers 30, such as file servers 30a, application servers 30b, web servers 30c, client servers 30d, switches 30e, and/or storage 30f. It is important to note that servers 30 can also be providing data that comes from outside of the servers 30 shown in FIG. 1, such as data from the Internet.

It is the responsibility of servers 30 to handle communications with a client 20 (e.g., 20a, 20b, and/or 20c) that is currently being used to access a given service of servers 30. The responsibility of servers 30 includes taking the output from servers 30 and converting it to a standard protocol for the thin client 20. This data protocol conversion is handled in one exemplary embodiment by a middleware layer, such as the X server, the Microsoft Windows™ interface, a video format transcoder, the OpenGL interface, or a variant of the Java.awt.graphics class running within servers 30. The middleware layer handles the translation of data to and from servers 30 and the client 20.

In an exemplary embodiment, each service is provided by a server that has been optimized for providing that service. For example, an Enterprise class server could be used to provide a unit service, a Sun MediaCenter server could be used to provide video service, a Hydra based NT server could be used to provide applet program execution service, etc.

Referring still to FIG. 1, the server or the group of servers 30 producing the services for clients 20 can be coupled directly to clients 20 through network 40. It is also possible for a server 30 to be a proxy for another server 30 providing the services, such as a database computer in a three-tiered architecture, where the proxy server 30 might only generate queries and execute user interface code.

The network of the exemplary embodiment can include any of multiple suitable communication paths for carrying data between servers 30 and clients 20. In one embodiment the network is a local area network (LAN) implemented as an Ethernet network. Any other LAN may also be utilized. The present invention also contemplates the use of wide area networks, the Internet, and others. The network of the present invention may also be implemented with a physical medium such as a wire or fiber optic cable, or it may be implemented in a wireless environment.

Figure 2:
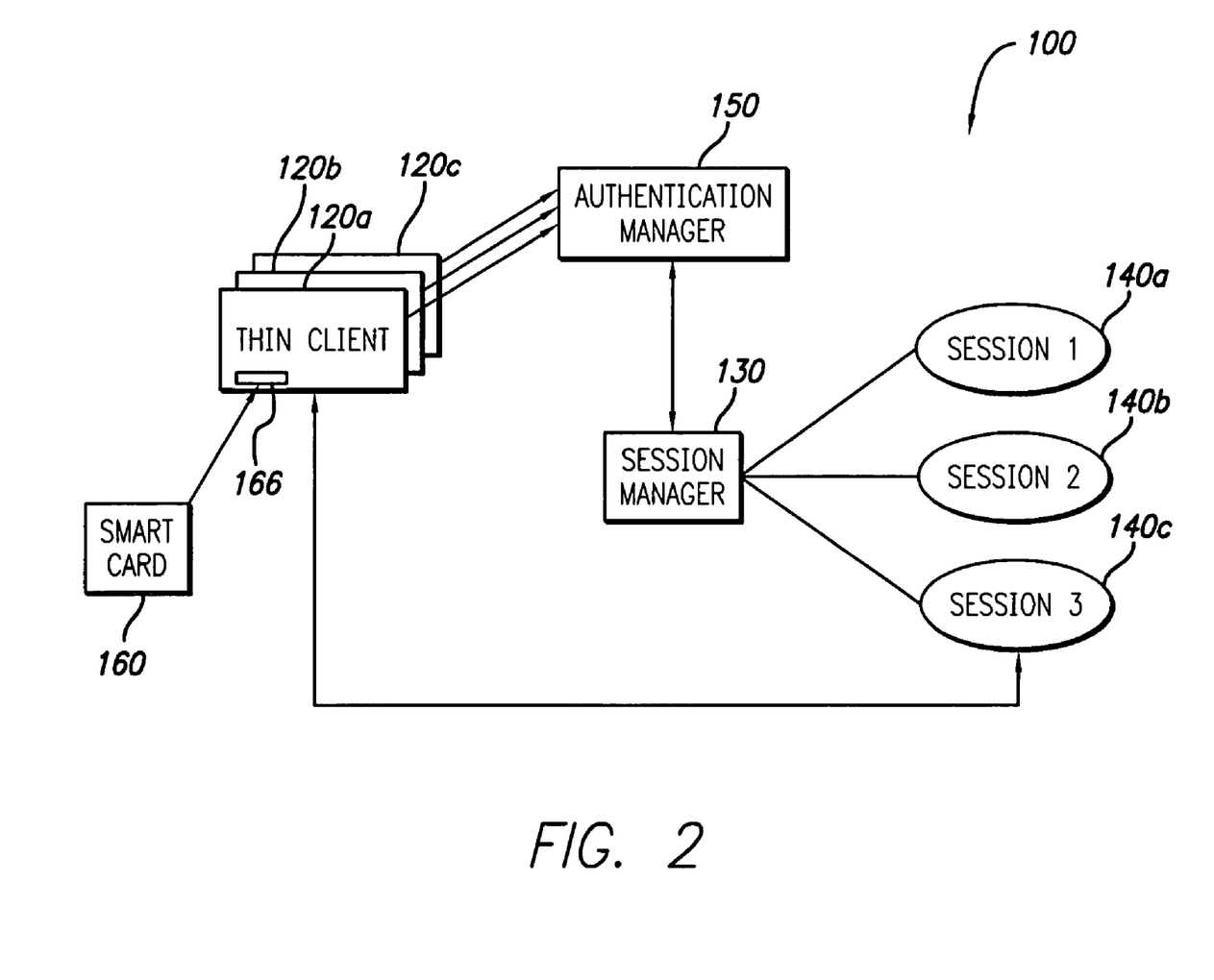
FIG. 2 illustrates a session management and authorization according to an exemplary embodiment.

In operation, the provision of services in a thin client architecture of an envisioned embodiment revolves around an abstraction referred to herein as a session. A session of the envisioned embodiment is a long-lived, persistent and reliable representation of those services (or applications) that are executing on behalf of a user at any point in time. Referring now to FIG. 2, session 140 is maintained by a server facility known as a session manager 130. The session manager 130 controls and maintains (e.g., via a database) the mappings between users and sessions 140 (e.g., 140*a*, 140*b*, and/or 140*c*), and manages the services that make up each session 140 (e.g., 140*a*, 140*b*, or 140*c*). For each user that network system 100 is aware of there are one or more sessions 140. The session manager 130 offers a service to the user that allows sessions 140 to be configured and new sessions 140 to be created.

Because the thin client or clients 120 of the present invention are stateless (i.e., devices that process information without any knowledge of previous/subsequent information), a user's session or user session 140 can be instantly sent to any thin client 120 (e.g., 120*a*, 120*b*, or 120*c*) within the network system 100. That is, a user can be in the middle of a user session 140 (e.g., typing an e-mail message) on one thin client 120, move to another thin client 120 and then resume the same user session 140 (e.g., 140*a*, 140*b*, or 140*c*) exactly where the user left off. Similarly, if a thin client 120 fails, a user can move from the failed thin client to another thin client without losing any work.

In addition, because a user is associated with its user session 140 (e.g., 140*a*, 140*b*, or 140*c*), and that session 140 can be displayed on any thin client 120 that the user accesses (e.g., 120*a*, 120*b*, or 120*c*), a server facility known as the authentication manager 150 is used for ensuring the legitimacy of the user and associating the user with its desired session 140. That is, initially a thin client 120 is in a sleep, stand-by, or off mode (or dormant state) when the thin client 120 is not in use by a user. When the user wants to use a particular thin client 120, an authentication exchange takes place that may include the use of one or more of a smart card 160, key, password, and/or biometric mechanism.

When the authentication manager 150 validates a user, it notifies the user's current session manager 130, which in turn notifies all of the services within the selected session 140, and the session's display is composed at the user's thin client 120 (e.g., at the display of the thin client). From within a session 140, a user can interact with existing services, initiate new services, or end executing services. When the user departs from the thin client 120 (e.g., by withdrawing a smart card 160), the authentication manager 150 notes this and notifies the session manager 130, which notifies all of its related services, which stop their display functions, and the thin client 120 (that the user was on) returns to the dormant state. The effect of the activation and deactivation of a thin client 120 is similar to turning off the display monitor on a conventional personal computer (PC). The application being displayed by the monitor (that has been turned off) is still available and is perhaps still executing on the PC, but no display is generated. However, unlike the conventional PC, one advantage of the present invention is that the user display can be accessed and displayed on any connected thin client 120.

Specifically, a user can access one or more sessions 140 by inserting a smart card 160 in a card reader (e.g., card reader 166) coupled to thin client 120*a*. A smart card 160 can be a card that is capable of storing information such as in a magnetic strip or memory of the smart card. The smart card can store user information such as a user's identification (i.e., user ID, such as a 64-bit number) and a secret code (e.g., a 128-bit random number) that is transmitted to thin client 120*a*. The secret code is used during authentication.

In the embodiment shown in FIG. 2, thin client 120*a* is aware of (or can obtain) its interconnection network address (e.g., Internet Protocol address) and the address of authentication manager 140. In addition, when a user initiates the login, thin client 120*a* initiates communication with authentication manager 140 to begin authentication. Authentication manager 140 is a program active (i.e., executing) on a server (e.g., 30 in FIG. 1) connected to thin client 120*a* via an interconnection network, such as a LAN. It should be apparent, however, that thin client 120*a* can be connected to authentication manager 204 using other interconnection network technologies such as a fiber channel loop or point-to-point cables. Thin client 120*a* sends a startup request to authentication manager 150 that includes a user identification (user ID).

In one embodiment, authentication manager 150 responds to the startup request by initiating an authentication to validate the user. Authentication can include any mechanism that verifies the identity of the user to the system 100. A key or password known only to the user, or biometrics information, can be used to authenticate the user.

Authentication may alternatively or additionally be performed by verifying a personal identification number (PIN) entered by the user at thin client 120*a*. Authentication manager 150 sends a command (i.e., a challenge command) to initiate entry of the user's PIN at thin client 120*a*. The user entry is packaged by thin client 120*a* and transmitted to authentication manager 150 (i.e., a challenge response). Authentication manager 150 verifies the challenge response with user information retained by authentication manager 150 (e.g., in an authentication database), information supplied by the user, and information that is generated during authentication. When the user is authenticated, the user is given access to a session (e.g., session 140*c*) that is a persistent representation of a related set of one or more services executing on behalf of the user.

More specifically, if the user is authenticated, authentication manager 150 notifies session manager 130 (via a connect message) that the user has logged into the network system 100 on thin client 120*a*. In response to the message from authentication manager 150, session manager 130 notifies the services in the user's current session (i.e., the services in session 140*c*) that the user is attached to thin client 120*a*. That is, session manager 130 sends a connect message to services to direct their output to thin client 120*a*. Session manager 130 ensures that services that are considered to be required services of the session 140*c* are executing. If not, session manager 130 causes them to be initiated. The user can then interact with the services within a session (e.g., session 140*c*). Thin client 120*a* is connected to servers (e.g., 30 in FIG. 1) running the services via an interconnection network such as a LAN or other interconnection technology. The user can also start new services or terminate existing services.

The user can detach from the network system 100 by removing the card from card reader 166. Other mechanisms to express a disconnect can also be used with the invention (e.g., a "sign-off" button on thin client 120*a*). The services of session 140*c* can continue to run even after the user removes the card 160 from card reader 166. That is, a user's associated session 140*c* and the services that comprise the session 140*c* can continue in existence during the period that a user is unattached (e.g., logged off) from the system 100. When the user removes the card 160 from card reader 166, thin client 120*a* notifies authentication manager 150 (e.g., via a disconnect message), which notifies session manager 130 (e.g., via a disconnect message). Session manager 130 then notifies the services of the session 140*c* (e.g., via a disconnect message) which terminate their transmission of display commands to thin client 120*a*. Services continue execution, however, during the time that the user is not logged onto a thin client 120 (e.g., 120*a*, 120*b*, or 120*c*). The user can then log back in using the same or another client, such as network client 120 (e.g., 120*a*, 120*b*, or 120*c*), connect to session 140*c* and interact with the services of session 140*c*.

Figure 3:
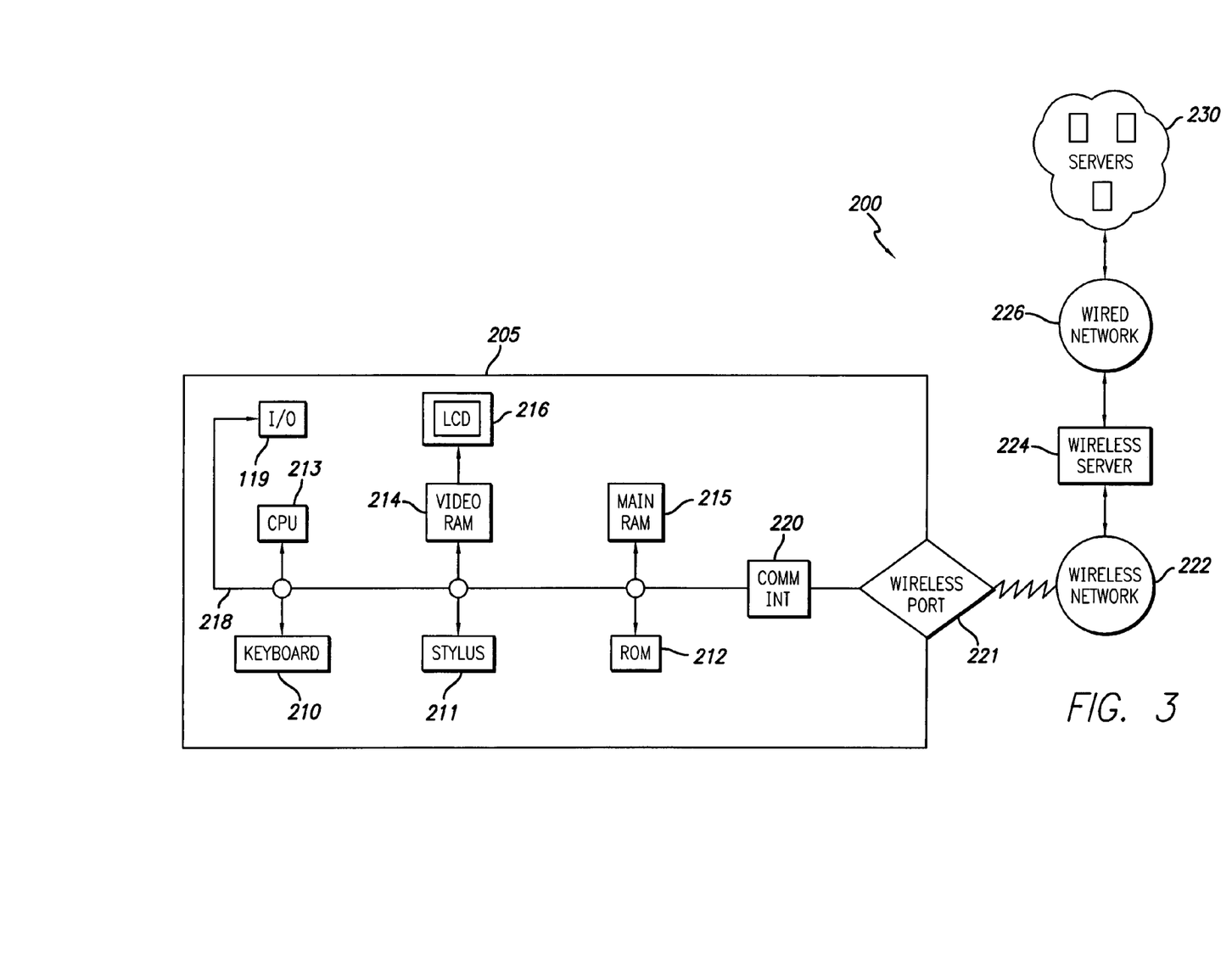
FIG. 3 illustrates a portable thin client according to an exemplary embodiment.

Referring to FIG. 3, there is shown portable thin client 205 (e.g., a personal digital assistant or PDA) as envisioned in an exemplary embodiment. Keyboard 210 and/or stylus (or touch screen) 211 are coupled to bi-directional system bus 218. Keyboard 210 and/or stylus 211 are for introducing user input to computer network system 200 and communicating that user input to processor 213. Other suitable input devices may be used in addition to, or in place of, stylus 211 and/or keyboard 210. Input/output (I/O) element 119 is also coupled to bi-directional system bus 218. I/O element 119 can be such I/O elements as a serial port, a parallel port, a USB, etc.

Portable thin client 205 further includes a video memory (e.g., video RAM 214), main memory (e.g., main RAM 115) and a persistent storage memory (e.g., ROM 212) that are all coupled to bi-directional system bus 218 along with keyboard 210 and/or stylus 211 and processor 213. The persistent storage may include both fixed and removable media, such as magnetic, optical or magnetic optical storage systems or any other available mass storage technology. Bus 218 may contain, for example, thirty-two (32) and/or sixty-four (64) address lines for addressing video RAM 214 or main RAM 215. Bus 218 also includes, for example, a 32- and/or 64-bit data bus for transferring data between and among the components, such as processor 213, main RAM 215, video RAM 214 and persistent storage memory 212. Alternatively, multiplex data/address lines may be used instead of separate data and address lines.

In one embodiment of the invention, processor 213 is a microprocessor, such as Motorola's Dragonball Multiprocessor without Interlocked Pipeline Stages (MIPS), Intel's X-Scale™ Processor or Hitachi's SH7709a, or a SPAR™ microprocessor from Sun Microsystems, Inc. However, any other suitable microprocessor may be utilized. The main RAM 215 can comprise of dynamic random access memory (DRAM); the video RAM 214 can comprise a dual-ported video random access memory; and the ROM 212 can comprise a Flash ROM.

Video RAM 214 can be used to drive a flat panel or liquid crystal display (LCD) 216, or any other suitable data presentation device. In addition, video RAM 214 can be coupled to a circuitry (not shown) that converts pixel data stored in video RAM 214 to a signal suitable for use by LCD 216. LCD 216 is a type of display suitable for displaying graphic images.

Portable thin client 205 also includes communication interface 220 coupled to bus 218. Communication interface 220 provides a two-way data communication coupling via a wireless port (or antenna) 221 to a wireless network 222. Communication interface 220 may comprise an integrated services digital network (ISDN) card, a modem, a radio frequency (RF) and power section (to handle power management and recharging, and also to deal with the hundreds of RF channels), and/or RF amplifiers to handle signals traveling to and from the RF port. Communication interface 220 is used to provide a data communication connection to the corresponding type of wireless line that comprises part of the wireless network 222.

Wireless network 222 is coupled to wireless server 224. Wireless server 224 is coupled to a plurality of servers 230 (e.g., file servers 30*a*, application servers 30*b*, web servers 30*c*, client servers 30*d*, switches 30*e*, and/or storage 30*f* shown in FIG. 1) via wired network 226. If wired network 226 is a LAN, then wireless server 224 comprises a LAN card to provide a data communication connection to the LAN.

In operation, portable thin client 205 can wirelessly send messages and receive data, including program code, through the network(s) (e.g., networks 222 and 226) and communication interface 220. The received program code may be executed by processor 213 as it is received, and/or stored in ROM 212 (e.g., a EPROM), or other non-volatile storage for later execution. In this manner, portable thin client 205 may obtain program code in the form of a carrier wave. The program or application code may be embodied in any form of computer program product. A computer program product comprises a medium configured to store or transport computer readable code, or in which computer readable code may be embedded. Some examples of computer program products are EPROMs, Flash memories, servers 230, and carrier waves.

Figure 4:
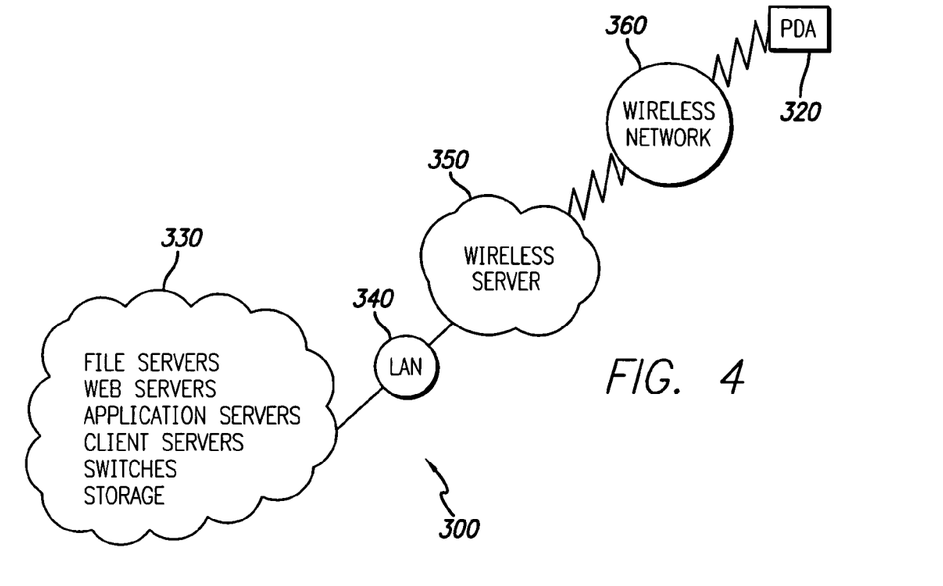
FIG. 4 illustrates a portable thin client architecture according to an exemplary embodiment.

FIG. 4 provides an exemplary embodiment of a portable thin client computer architecture indicated generally at 300, that utilizes a PDA 320 (or the portable thin client). In this thin client architecture 300, servers 330 via a LAN 340 provide data and computational functionalities to PDA 320. At PDA 320, all functionality is eliminated, except that which generates output to a user (e.g. display and speakers), takes input from the user (e.g. stylus and/or keyboard) or other peripherals that the user may interact with (e.g. scanners, cameras, removable storage, etc.). That is, all other computational functionalities (or tasks or services) are done by servers 330 and the computation is done independently of the destination.

More specifically, the servers 330 here communicate with PDA 320 through a LAN 340 (or a wired network), a wireless server 350, and a wireless network 360 (e.g., a 802.11 or a wireless fidelity or a Wi-Fi network). The computational power and state maintenance are processed and maintained at servers 330. Servers 330 include such servers as file servers, application servers, web servers, thin client servers, switches, and/or storage. It is important to note that servers 330 can also be providing data that comes from outside of the servers 330 shown in FIG. 4, for example, data from the Internet.

It is the responsibility of servers 330 and wireless server 350 to handle communications with PDA 320 that is currently being used to access a given session of the servers 330. The responsibility of servers 330 includes taking the output from servers 330 and converting it to a wired protocol for transmission to wireless server 350 via LAN 340. Wireless server 350 takes the output in the wired protocol and converts it to a wireless protocol for transmission to PDA 320 via wireless network 360.

Figure 5:
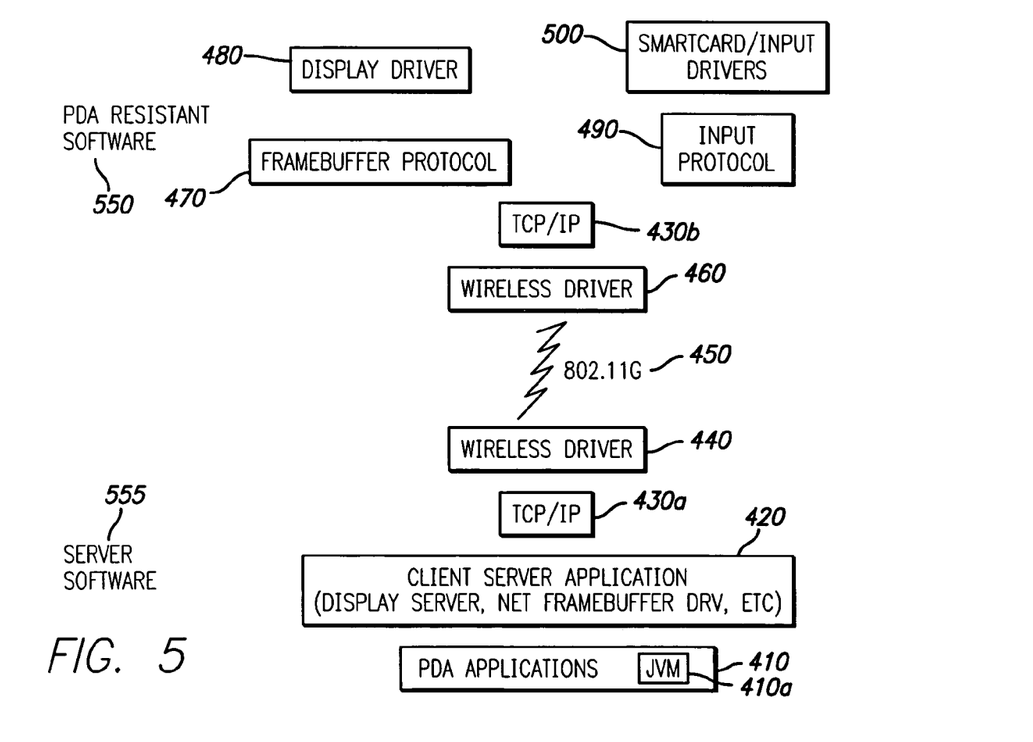
FIG. 5 illustrates a server software stocks and a client software stocks according to an exemplary embodiment.

Specifically, and referring now also to FIG. 5, in an exemplary embodiment of the software stacks of the present invention, user services (or PDA applications 410) and windows/display software are running on at least one of the servers 330. The server 330 creates the screen image that PDA 320 should display. The server 330 transmits this screen image over network(s) 340 and 360 as if it was, communicating to a local graphics device of the at least one server 330 (or a framebuffer or a graphics card). That is, the server 330 creates a "framebuffer" image and passes this image to the network (or net) framebuffer driver of thin client server application 420 as a block of data. The network framebuffer driver of thin client server application 420 then fragments the block of data into Transmission Control Protocol/Internet Protocol (TCP/IP) packets 430*a*, which are sent to PDA 320 via a server side wireless driver 440, a wireless network 450 (e.g., via a 802.11 network or wireless LAN protocol), and a PDA side wireless driver 460. After receiving TCP/IP packets 430*b* on the PDA side (i.e., 550), framebuffer protocol 470 re-assembles TCP/IP packets 430*b* into an image that is sent to local display driver 480 to be displayed on the PDA's LCD (e.g., 216 in FIG. 3).

Input protocol 490 is also provided on the PDA's software stacks of an exemplary embodiment (or in PDA resident software 550). Input protocol 490 takes keyboard/stylus/smartcard "actions" via smart card/input drivers 500 and converts the "actions" into a TCP/IP packet 430*b* which is sent back to the servers 330 as a user feedback to at least one of the services (or applications) running on at least one of the servers 330. In the context of the present embodiment, "action" does not mean that the PDA 320 sends back every stylus pixel movement as an individual network packet, instead the present "action" stands for the concept of the PDA 320 sending back a packet for things that need actioning from the server 330 (e.g., moving a cursor over tab and click). Particularly, for the present PDA 320, the input may be: data read off of an inputted smart card (e.g., via a smart card driver within smart card/input drivers 500), keys pressed, characters entered on a stylus of the PDA (or stylus clicks), and a smart card removed notification.

In an exemplary embodiment, at least one of the servers 330 runs a display manager (not shown) for each PDA. The display manager (similar to X-server or windows manger) communicates display data for the sessions (or applications) running on servers 330. The display manager creates the aggregated screen images from the communicated display data for the LCD of the PDA 320. In the present embodiment, the display manager is running on the server 330. The display manager can be used to create an overall display image from the applications running on servers 330. In addition, the display manager or an alternative display manager running on one or more servers 330 can be used to create an appropriate (or a customized) screen image for a specific LCD on the PDA 320 or on another PDA.

In a more specific embodiment, PDA applications 410 could be divided into: a Java Virtual Machine (JVM or JVM 410*a* shown in FIG. 5), a Swing application interface (API), and a Java Application (i.e., a service performed by a Java server). A Swing API is the Java graphic user interface (GUI) API and is part of the JVM (i.e., the Swing API is the interface to the Java application for display data). The JVM (which is a self-contained operating environment) provides a conduit between the Java application sending display data to the swing API and the JVM interface sending data to the PDA display driver 480. That is, all the PDA specifics for displaying data on the PDA 320 are coded and available within the JVM.

In the present embodiment and referring to FIGS. 4 and 5, PDA screen driver 480 (e.g., a conventional display driver) is maintained on PDA 320 (i.e., as a PDA resident software 550) but JVM 410*a* is moved to servers 330 (i.e., as a server software 555). The embodiment then shims (or provides) the interfaces (including the Swing API) between JVM 410*a* and display driver 480 over wireless network 450 (e.g., via existing framebuffer protocol 470) so that Java applications (e.g., PDA applications 410) running on servers 330 can be displayed on PDA 320.

The computer systems described above are for purposes of example only. An embodiment of the invention may be implemented in and/or with any type of computer system or programming or processing environment. For example, an embodiment may be implemented with a virtual desktop system architecture that is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference (including the attached appendix in the co-pending application).

In addition, referring now back to FIG. 3, portable thin client 205 may be implemented as a hand-held computer. In another embodiment, portable thin client 205 is a palm-sized computer. As discussed above, the major differences between the two types of portable thin client 205 (e.g., PDA) are size, display and mode of data entry. Compared to palm-sized computers, hand-held computers tend to be larger and heavier. The hand-held computers have larger liquid crystal displays (LCD) and use a miniature keyboard, usually in combination with touch-screen technology, for data entry. Palm-sized computers are smaller and lighter. They have smaller LCDs and rely on stylus/touch-screen technology and handwriting recognition programs for data entry. For example, a palm-sized computer of the present invention can include a keyboard 210 and a color LCD 216 that has 760× 1024 pixels and a palm-sized computer of the present invention can include a stylus 211 for input and a 256×256 pixel black and white LCD 216.

Moreover, by reducing the function of portable thin client 205 into a well-defined, fixed set of behaviors, a user could start a session on a first portable thin client (e.g., a palm-sized computer with a keyboard 210 for input and 760×1024 pixel color LCD), then remove a smart card and place in a second (and different) portable thin client (e.g., a hand-held computer with a stylus for input and 256×256 pixel black and white LCD). That is, as long as an application writer running in wired servers 230 implements a Graphic User Interface (GUI) of the first and second thin clients correctly (i.e., sizes GUI to the LCD of the thin clients rather than a fixed size) it should provide the display in both clients of the session in the same state.

Figure 6:
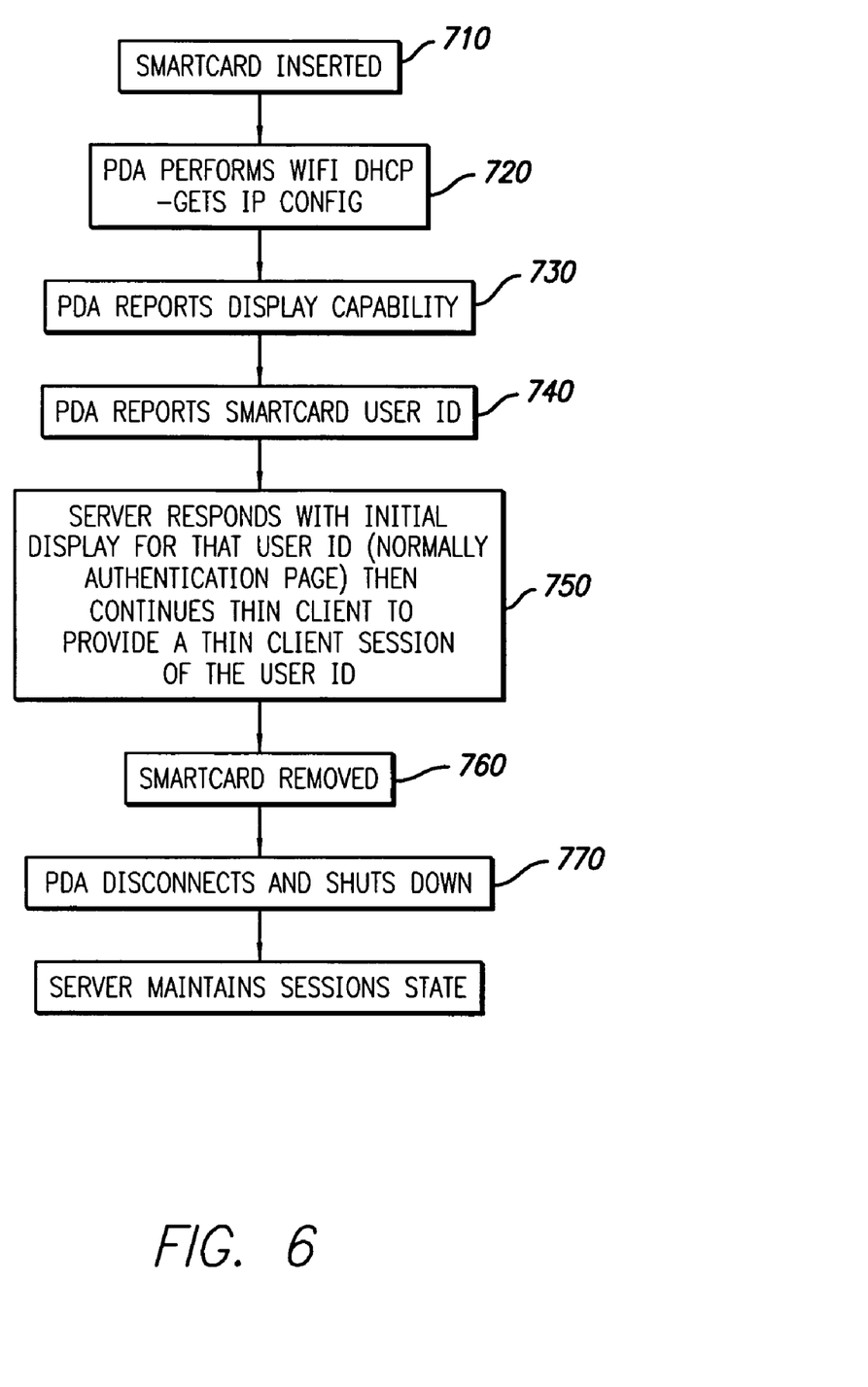
FIG. 6 illustrates a flow diagram of providing a user session to a portable thin client according to an exemplary embodiment.

In general, and according to the foregoing, FIG. 6 is a flowchart illustrating an exemplary embodiment of the method for providing user sessions to portable thin clients (e.g., PDAs). Initially, at step 710, a user inserts a smart card (e.g., 160 in FIG. 2) into a smart card reader (e.g., 166 in FIG. 2) of a PDA (or a portable thin client). Next, at step 720, the PDA performs a protocol to have its associated Internet Protocol (IP) addresses configured and/or located (e.g., configuring an IP address of the PDA and locating an IP address of an authentication manager of a server servicing the PDA). For example, the PDA can perform a WiFi Dynamic Host Configuration Protocol (DHCP). The DHCP assigns an IP address to the PDA on the WiFi network. The dynamic addressing capability of the DHCP allows the PDA to have a different IP address every time the PDA connects to the network. In one embodiment, the PDA's IP address can change even while the PDA is still connected to the network. DHCP also supports a mix of static and dynamic IP addresses. Generally, dynamic addressing simplifies network administration because the software keeps track of IP addresses rather than requiring an administrator to manage the task. As a result, a new PDA can be added to a network without the requirement of manually assigning the computer a unique IP address. In addition, rather than having the PDA get its network configuration after the smart card is inserted, the PDA alternatively may get its network configuration when it is powered on and then waits for the smart card insertion having its IP addresses already configured.

Once the IP addresses of the PDA have been configured (and/or assigned), at step 730, the PDA reports its display capability to at least one of the servers on the network. At step 740, the PDA reports the user identifier (or user ID) of the inserted smart card. At step 750, the server responds with an initial display for the user ID (e.g., an authentication page). As discussed above (e.g., via a session manager 130 in FIG. 2), the servers then continue with the thin client connections with the PDA to provide the necessary thin client session or sessions (e.g., 140 in FIG. 2) to the user.

At step 760, the user removes the smart card from the PDA. Once the smart card has been removed from the PDA, at step 770, the PDA disconnects from the network and shuts down. In this embodiment, however, at step 780, the user session or sessions (including the session state or states) that were provided to the PDA are continually maintained at the servers. Accordingly, there is no data loss when the user is disconnected from the PDA or when the PDA is faulty. In addition, as a result of designing (or re-architecting) the PDA as a portable thin client, there is no need to download software (or application or applications) and the operating system(s) operating the software to the PDA because server—through the network—provides these services (e.g., the application services and/or the operating system services). Moreover, the present PDA does not have to be upgraded if an application upgrade is required or a new application is needed because the new or upgraded application can just be provided at the servers running the application and servicing the PDA.

Having described the preferred embodiments of the system and method of the portable thin client for the enterprise workspace, it should be apparent to those skilled in the art that certain advantages of the described system and method have been achieved. It should also be appreciated that various modifications, adaptations and alternative embodiments thereof may be made within the scope and spirit of the present invention.

The invention claimed is:

1. A system comprising:
a first wireless client device;
a second wireless client device; and
one or more server computers, wherein the one or more server computers are configured to:

provide a user with access to a session representing one or more software services associated with the user by beginning transmission of first display information for the one or more software services to the first wireless client device;

receive a first notification from the first wireless client device indicating that the user has stopped using the first wireless client device, wherein each of the one or more software services associated with the user is in a respective state when the user stops using the first wireless client device;

in response to the first notification, terminate the transmission of the first display information to the first wireless client device;

maintain the session after the user has stopped using the first wireless client device by maintaining the respective state of each of the one or more software services associated with the user, wherein the one or more server computers are configured to maintain the respective state of each of the one or more software services associated with the user by continuing to execute each of the one or more software services associated with the user after receiving the first notification indicating that the user has stopped using the first wireless client device; and in response to receiving a second notification from the second wireless client device indicating that the user has begun using the second wireless client device, provide the user with access to the session by beginning transmission of second display information for the one or more software services associated with the user to the second wireless client device, wherein the second display information indicates the respective state of each of the one or more software services associated with the user.

2. The system of claim 1,
wherein the first wireless client device comprises a first personal digital assistant (PDA);
wherein the second wireless client device comprises a second PDA.

3. The system of claim 1,
wherein receiving the second notification from the second wireless client device indicating that the user has begun using the second wireless client device comprises receiving user authentication information for the user from the second wireless client device;
wherein the one or more server computers are configured to authenticate the user using the user authentication information before transmitting the second display information for the one or more software services associated with the user to the second wireless client device.

4. The system of claim 1, wherein the first wireless client device comprises a first display screen and the second wireless client device comprises a second display screen;
wherein the one or more server computers are further configured to:
receive information from the first wireless client device indicating display capability of the first display screen; and
receive information from the second wireless client device indicating display capability of the second display screen, wherein the display capability of the second display screen is different from the display capability of the first display screen;
wherein the one or more server computers are configured to format the first display information transmitted to the first wireless client device according to the display capability of the first display screen and format the second display information transmitted to the second wireless client device according to the display capability of the second display screen.

5. The system of claim 4, wherein the first display screen has a first size and the second display screen has a second size, wherein the second size is different from the first size;

wherein the one or more server computers are configured to format the first display information transmitted to the first wireless client device for display on the first display screen of the first size and format the second display information transmitted to the second wireless client device for display on the second display screen of the second size.

6. The system of claim 1, wherein the one or more server computers are configured to execute a display manager, wherein the display manager is operable to create one or more screen images for display on the first wireless client device, wherein the one or more server computers transmitting the first display information to the first wireless client device comprises the one or more server computers transmitting the one or more screen images to the first wireless client device.

7. The system of claim 6, wherein the display manager creating the one or more screen images comprises the display manager creating one or more framebuffer images.

8. The system of claim 1, wherein the first wireless client device is larger and heavier than the second wireless client device.

9. The system of claim 1, wherein the first wireless client device is larger and heavier than a palm-sized computer, and wherein the second wireless client device is a palm-sized computer.

10. The system of claim 1, wherein receiving the second notification from the second wireless client device indicating that the user has begun using the second wireless client device comprises receiving an identifier for the user from the second wireless client device;

wherein the one or more server computers are configured to request authentication information for the user from the second wireless client device in response to receiving the identifier for the user and before beginning transmission of the second display information for the one or more software services associated with the user to the second wireless client device.

11. The system of claim 10, wherein the second wireless client device is configured to send the identifier for the user to the one or more server computers in response to the user inserting a smart card into the second wireless client device.

12. The system of claim 1, wherein the one or more server computers include one or more wireless servers and one or more wired servers coupled to the one or more wireless servers;

wherein the one or more wired servers are configured to communicate with the one or more wireless servers through wired communication means;

wherein the one or more wireless servers are configured to communicate with the first wireless client device and the second wireless client device through wireless communication means.

13. The system of claim 1, wherein the one or more software services associated with the user execute on the one or more server computers without possessing knowledge of which wireless client device the user is currently using.

14. The system of claim 1, wherein the first wireless client device is configured to execute a display driver, wherein at least one of the one or more server computers are configured to execute a corresponding virtual machine of said display driver, and wherein said virtual machine is configured to transmit the first display information to the display driver on the first wireless client device.

15. The system of claim 1, wherein the first wireless client device is configured to communicate with the one or more server computers according to a thin client computing model such that the first wireless client device operates to provide input to and display output from the one or more software services associated with the user, and all other computation required by the one or more software services is performed on the one or more server computers.

16. The system of claim 1, wherein the user is a first user;

wherein the session is a first session;

wherein the one or more server computers are further configured to:

after receiving the first notification from the first wireless client device indicating that the first user has stopped using the first wireless client device, receive a third notification from the first wireless client device indicating that a second user has begun using the first wireless client device; and in response to the third notification, provide the second user with access to a second session representing one or more software services associated with the second user by transmitting third display information for the one or more software services associated with the second user to the first wireless client device.

17. The system of claim 1, wherein the first wireless client device includes hardware and software resources for receiving user input and displaying the first display information received from the one or more server computers, but does not include hardware and software resources for executing user applications.

18. The system of claim 1, wherein the first wireless client device includes hardware and software resources for receiving user input and displaying the first display information received from the one or more server computers, but does not include hardware and software resources for performing other functions.

19. The system of claim 1, wherein the one or more server computers are further configured to receive user input to the one or more software services associated with the user from the first wireless client device before the user stops using the first wireless client device, wherein each of the one or more software services associated with the user enters its respective state in response to the user input.

20. The system of claim 1, wherein the first wireless client device is configured to provide the one or more server computers with the first notification indicating that the user has stopped using the first wireless client device in response to the user removing a smart card identifying the user from the first wireless client device.

21. The system of claim 1, wherein the first wireless client device and the second wireless client device do not have any knowledge of previous states of the one or more software services associated with the user.

22. A method comprising:

one or more server computers providing a user of a first wireless client device with access to a session representing one or more software services associated with the user by beginning transmission of first display information for the one or more software services to the first wireless client device;

the one or more server computers receiving a first notification from the first wireless client device indicating that the user has stopped using the first wireless client device, wherein each of the one or more software services associated with the user is in a respective state when the user stops using the first wireless client device;

in response to the first notification, the one or more server computers terminating the transmission of the first display information to the first wireless client device;

the one or more server computers maintaining the session after the user has stopped using the first wireless client device by maintaining the respective state of each of the one or more software services associated with the user, wherein maintaining the respective state of each of the one or more software services associated with the user comprises continuing to execute each of the one or more software services associated with the user after receiving the first notification indicating that the user has stopped using the first wireless client device; and in response to receiving a second notification from a second wireless client device indicating that the user has begun using the second wireless client device, the one or more server computers providing the user with access to the session by beginning transmission of second display information for the one or more software services associated with the user to the second wireless client device, wherein the second display information indicates the respective state of each of the one or more software services associated with the user.

23. Memory medium storing program instructions executable by one or more processors of one or more server computers to cause:

the one or more server computers to provide a user of a first wireless client device with access to a session representing one or more software services associated with the user by beginning transmission of first display information for the one or more software services to the first wireless client device;

the one or more server computers to receive a first notification from the first wireless client device indicating that the user has stopped using the first wireless client device, wherein each of the one or more software services associated with the user is in a respective state when the user stops using the first wireless client device;

the one or more server computers to terminate the transmission of the first display information to the first wireless client device in response to the first notification;

the one or more server computers to maintain the session after the user has stopped using the first wireless client device by maintaining the respective state of each of the one or more software services associated with the user, wherein the program instructions are executable by the one or more processors of the one or more server computers to cause the one or more server computers to maintain the respective state of each of the one or more software services associated with the user by continuing to execute each of the one or more software services associated with the user after receiving the first notification indicating that the user has stopped using the first wireless client device; and the one or more server computers to receive a second notification from a second wireless client device indicating that the user has begun using the second wireless client device; and the one or more server computers to provide the user with access to the session in response to the second notification by beginning transmission of second display information for the one or more software services associated with the user to the second wireless client device, wherein the second display information indicates the respective state of each of the one or more software services associated with the user.

* * * * *

UNITED STATES PATENT AND TRADEMARK OFFICE
CERTIFICATE OF CORRECTION

PATENT NO. : 7,685,257 B2  Page 1 of 1
APPLICATION NO. : 10/704939
DATED : March 23, 2010
INVENTOR(S) : James E. King and Karen C. Roles

It is certified that error appears in the above-identified patent and that said Letters Patent is hereby corrected as shown below:

Inventors:

Title page, item (75) should read James E. King and Karen C. Roles

Signed and Sealed this

Eighth Day of June, 2010

David J. Kappos
*Director of the United States Patent and Trademark Office*